(12) United States Patent
Kierbel et al.

(10) Patent No.: US 11,027,818 B2
(45) Date of Patent: Jun. 8, 2021

(54) METHOD FOR MANUFACTURING AN AIRCRAFT LEADING EDGE PANEL THAT ALLOWS EXTENSIVE LAMINAR FLOW TO BE OBTAINED, AND LEADING EDGE COMPRISING AT LEAST ONE PANEL OBTAINED USING THE SAID METHOD

(71) Applicants: Airbus Operations S.A.S., Toulouse (FR); AIRBUS SAS, Blagnac (FR)

(72) Inventors: Daniel Kierbel, Toulouse (FR); Mathias Farouz-Fouquet, Toulouse (FR); Laurent Malard, Toulouse (FR)

(73) Assignees: Airbus Operations S.A.S.; AIRBUS SAS

( * ) Notice: Subject to any disclaimer, the term of this patent is extended or adjusted under 35 U.S.C. 154(b) by 366 days.

(21) Appl. No.: 16/108,575

(22) Filed: Aug. 22, 2018

(65) Prior Publication Data
US 2019/0061908 A1 Feb. 28, 2019

(30) Foreign Application Priority Data
Aug. 30, 2017 (FR) ..................................... 17 57970

(51) Int. Cl.
*B64C 3/26* (2006.01)
*B64C 3/28* (2006.01)
*B64C 21/10* (2006.01)
*B21D 53/92* (2006.01)
(Continued)

(52) U.S. Cl.
CPC .............. *B64C 3/26* (2013.01); *B21D 26/021* (2013.01); *B21D 53/92* (2013.01);
(Continued)

(58) Field of Classification Search
CPC .... B64C 3/24; B64C 3/26; B64C 3/28; B21D 26/057; B21D 53/92; B29D 45/14344; B29D 45/14336; B29C 70/78
See application file for complete search history.

(56) References Cited

U.S. PATENT DOCUMENTS

| 4,935,277 A | 6/1990 | Le Balc'h |
| 5,308,570 A * | 5/1994 | Hara ...................... B29C 43/18 |
| | | 264/255 |

(Continued)

FOREIGN PATENT DOCUMENTS

| EP | 0 296 964 A1 | 12/1988 |
| FR | 1 122 894 A | 9/1956 |

(Continued)

*Primary Examiner* — Richard G Davis
(74) *Attorney, Agent, or Firm* — Lerner, David, Littenberg, Krumholz & Mentlik, LLP

(57) ABSTRACT

A method for manufacturing an aircraft leading edge panel, includes a step of overmoulding a coating onto a sheet positioned in a cavity of a mould, which cavity is delimited by a shaping surface which exhibits an optimized surface finish. The coating includes, after the overmoulding step, an exterior face which corresponds to the exterior face of the panel that is to be obtained and which exhibits an optimized surface finish conferred by the shaping surface of the mould. A panel may be obtained using this method and a leading edge includes at least one such panel. Because of the optimized surface finish of the exterior surface thereof, the panel contributes to extending the regions of laminar flow.

9 Claims, 4 Drawing Sheets

(51) Int. Cl.
  *B29C 45/14* (2006.01)
  *B21D 26/021* (2011.01)
  *B64C 3/24* (2006.01)
  *B29C 70/78* (2006.01)

(52) U.S. Cl.
  CPC .. *B29C 45/14008* (2013.01); *B29C 45/14336* (2013.01); *B29C 70/78* (2013.01); *B64C 3/24* (2013.01); *B64C 3/28* (2013.01); *B64C 21/10* (2013.01)

(56) References Cited

U.S. PATENT DOCUMENTS

| | | | | |
|---|---|---|---|---|
| 6,117,376 A | * | 9/2000 | Merkel | B64C 3/24 264/46.5 |
| 2009/0041985 A1 | * | 2/2009 | Von Varendorff | B64C 9/00 428/152 |
| 2010/0065687 A1 | * | 3/2010 | Douglas | B64C 3/185 244/130 |
| 2010/0140405 A1 | * | 6/2010 | Capasso | B64C 3/28 244/123.13 |
| 2011/0168852 A1 | | 7/2011 | Porte et al. | |
| 2015/0375846 A1 | * | 12/2015 | Garcia Nieto | B64C 3/28 244/123.1 |
| 2016/0167269 A1 | * | 6/2016 | Pautard | F01D 5/147 264/259 |

FOREIGN PATENT DOCUMENTS

| FR | 2 932 106 A1 | 12/2009 |
|---|---|---|
| FR | 2 975 929 A1 | 12/2012 |
| FR | 3 008 920 A1 | 1/2015 |

\* cited by examiner

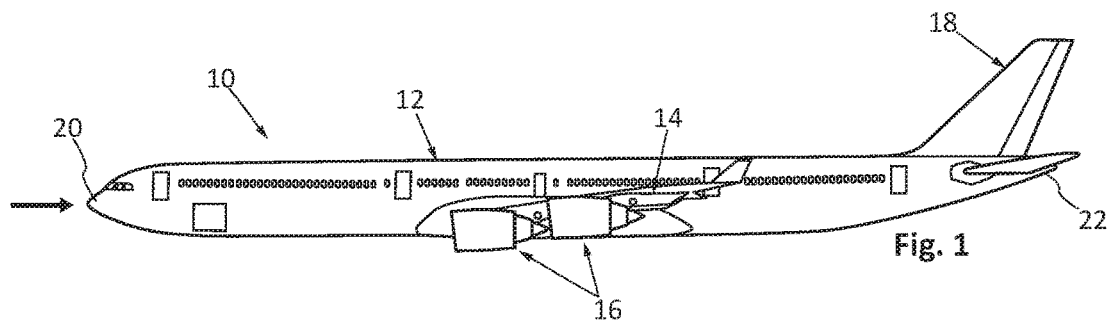
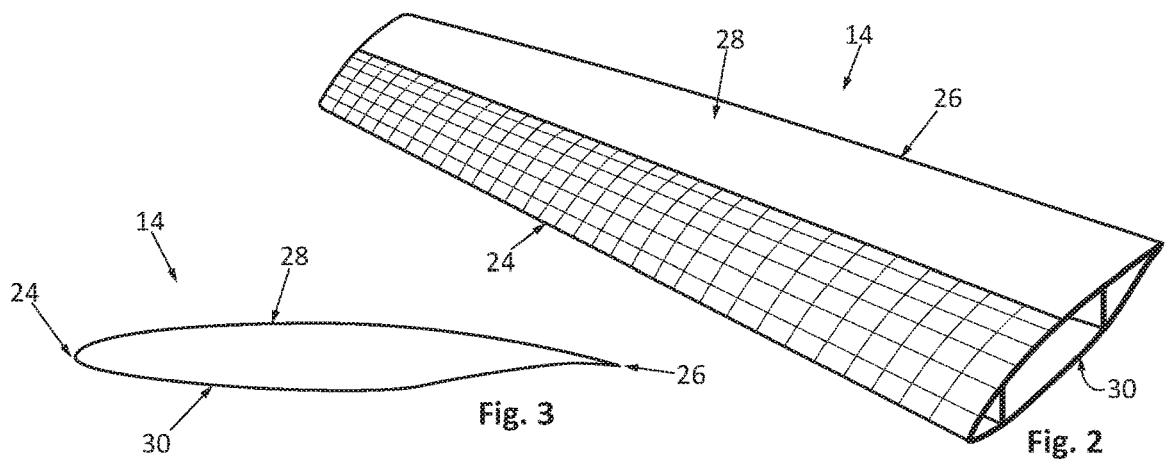
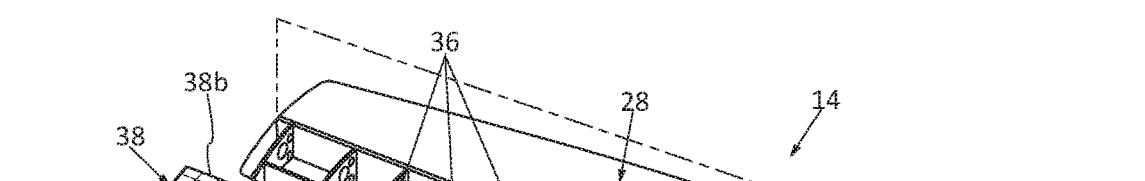
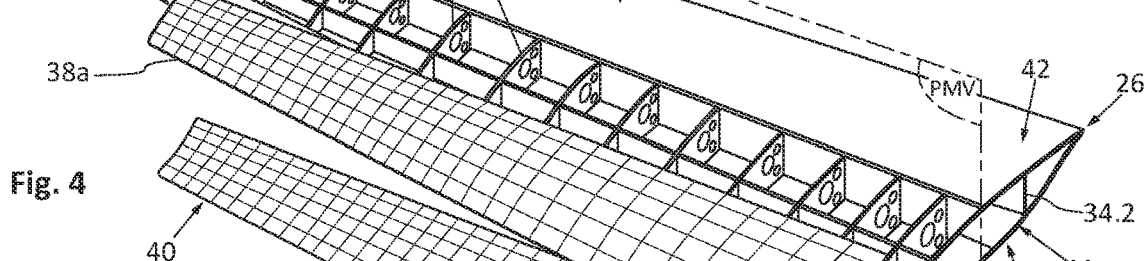
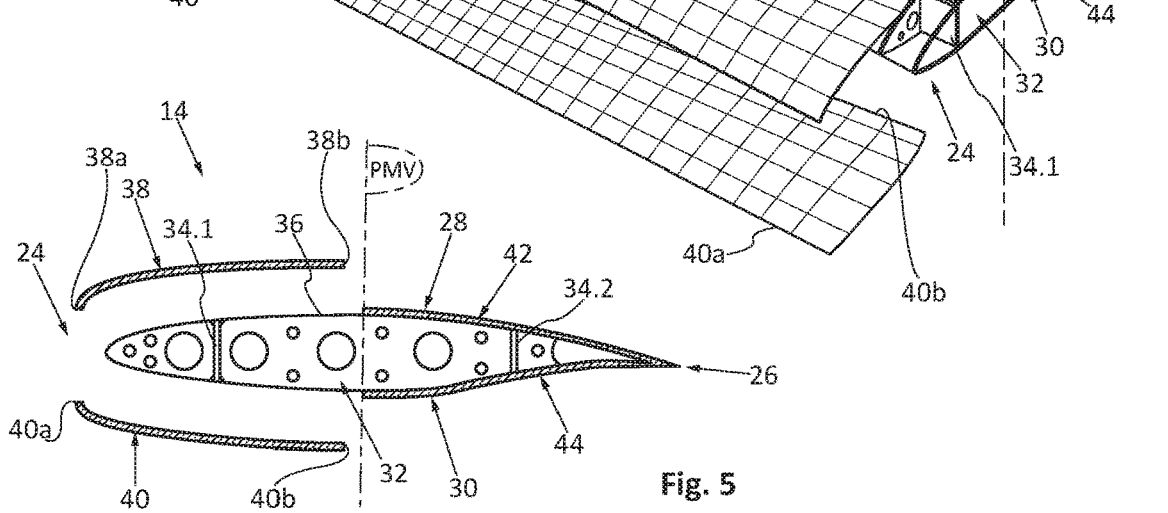

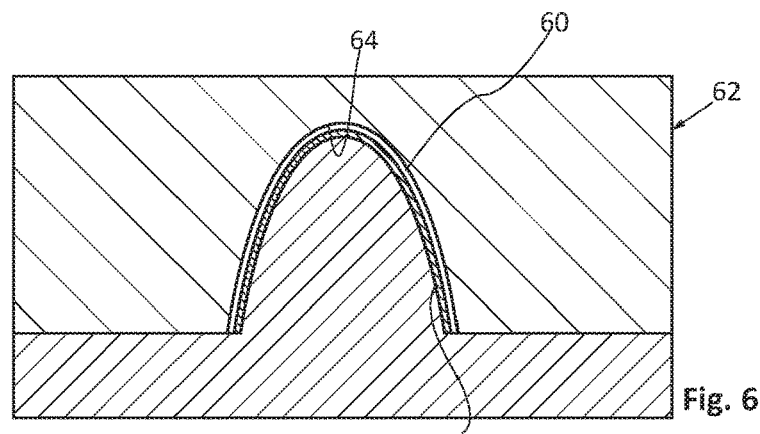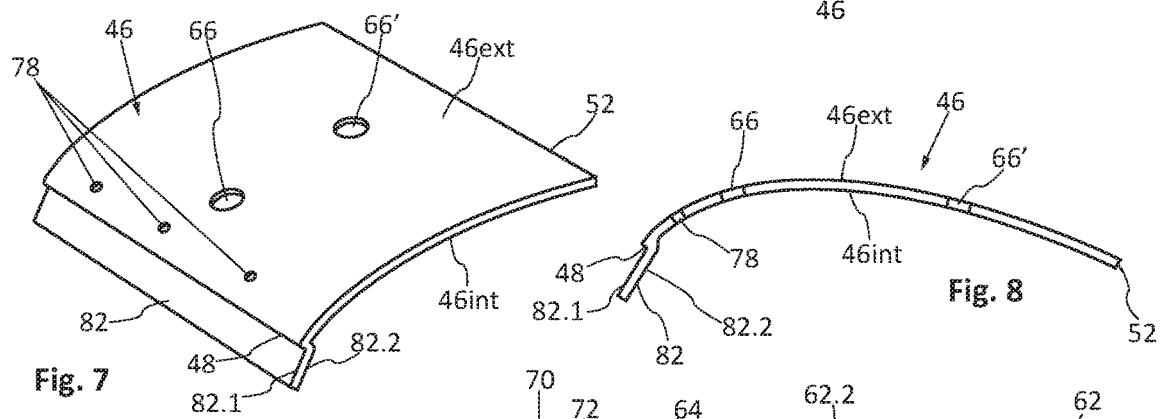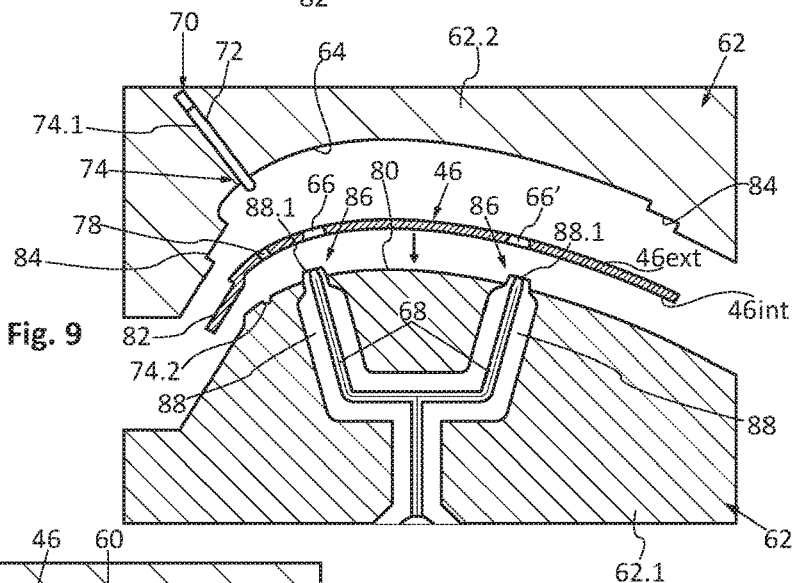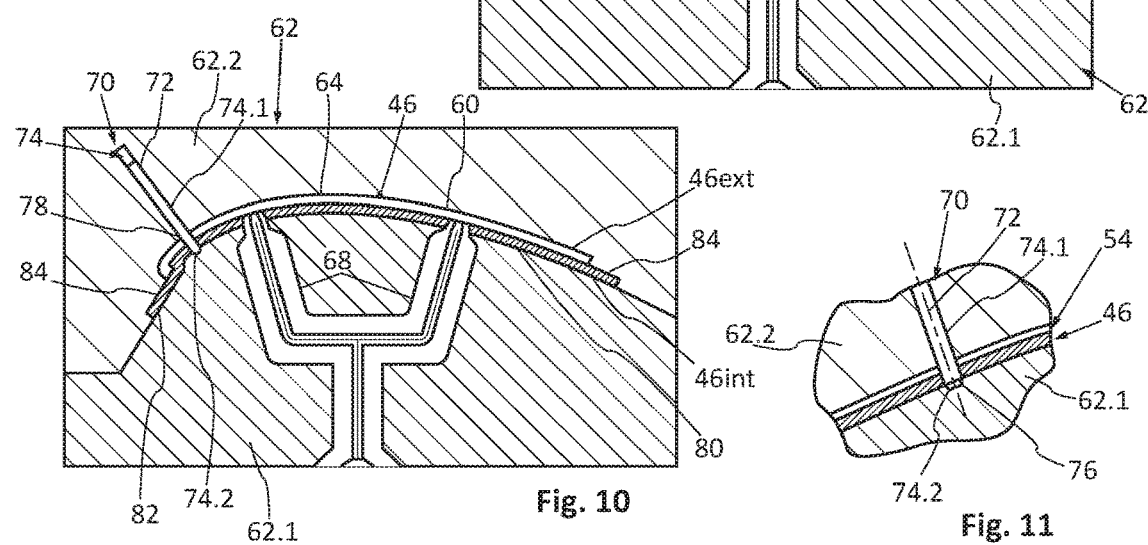

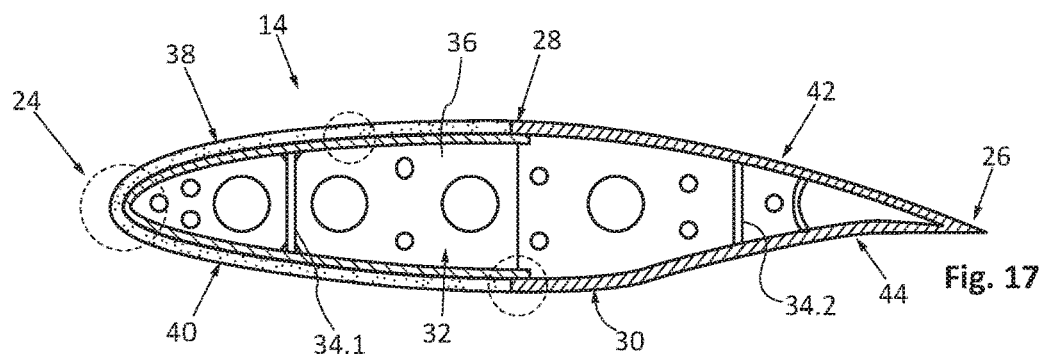
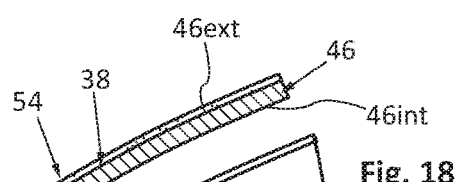
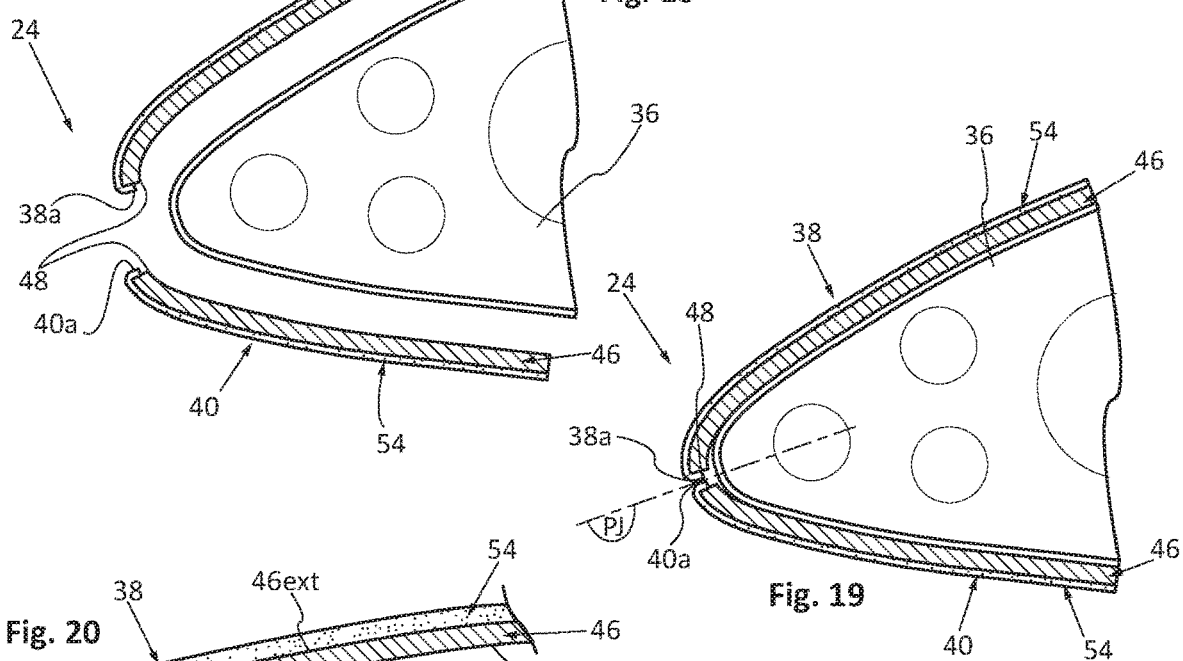
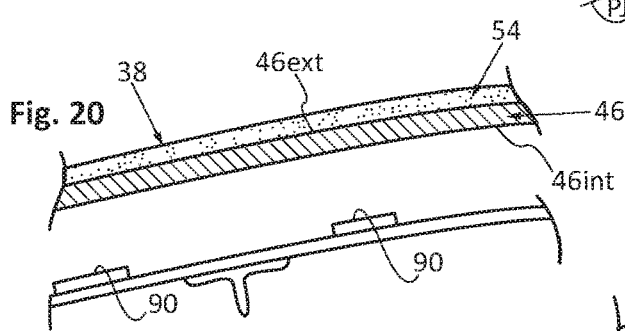
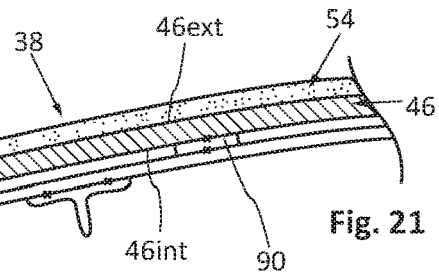
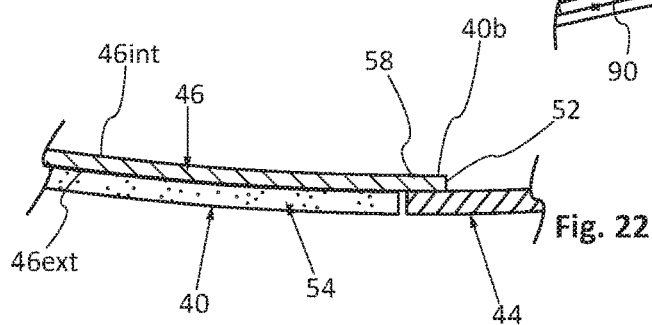

METHOD FOR MANUFACTURING AN AIRCRAFT LEADING EDGE PANEL THAT ALLOWS EXTENSIVE LAMINAR FLOW TO BE OBTAINED, AND LEADING EDGE COMPRISING AT LEAST ONE PANEL OBTAINED USING THE SAID METHOD

FIELD OF THE INVENTION

The present application relates to a method for manufacturing an aircraft leading edge panel that makes it possible to obtain extensive laminar flow, and to a leading edge comprising at least one panel obtained using the said method.

BACKGROUND OF THE INVENTION

An aircraft wing comprises a structure which exhibits two spars joined together by ribs, to which structure panels that form the skin of the wing are attached and fixed. Thus, the wing generally comprises a first panel which forms the extrados (top skin), a second panel which forms the intrados (bottom skin) and one or more U-shaped panel(s) which forms (form) the leading edge.

According to one embodiment, the panels attached to the structure of the wing are sheet metal plates which are machined and shaped.

In order to reduce the drag of the wing, and therefore the energy consumption of the aircraft, the air flowing in contact with the wing needs to be laminar flow, from the leading edge of the wing over the greatest possible extent of the wing surface.

In order to extend the region of laminar flow, the roughness of the surface of the panels in contact with the airflow needs to be as low as possible and the dimensional and geometric tolerances on the panels need to be as small as possible.

Now, reducing these dimensional and geometric tolerances and reducing the roughness has a tendency to make the wing manufacturing process more complex and to greatly increase production costs.

Document FR-2.932.106 proposes improving the laminar flow at the leading edge of an aircraft nacelle air intake by applying a coating to the region at which two adjacent panels meet. Prior to applying the coating, the two panels positioned on and fixed to the structure of the nacelle are machined to create a groove that straddles the two panels. Next, the groove is filled with a silicone-based paint or coating. This solution makes it possible to improve the laminar flow in a restricted area.

BRIEF SUMMARY OF THE INVENTION

Aspects of the present invention may overcome all or some of the disadvantages of the prior art.

An aspect of the invention is a method for manufacturing an aircraft leading edge panel, characterized in that it comprises the steps of:
placing a sheet in a cavity of a mould, which cavity is delimited by a shaping surface which is configured to shape an exterior face of the panel that is to be obtained, and which exhibits an optimized surface finish,
overmoulding a coating onto the sheet by injecting a material into the cavity of the mould, the coating comprising, after the overmoulding step, an exterior face which corresponds to the exterior face of the panel that is to be obtained and which exhibits an optimized surface finish conferred by the shaping surface of the mould.

According to an aspect of the invention, the optimized surface finish of the upper and/or lower front panel of a leading edge is obtained during the overmoulding of the coating rather than by machining, and this has a tendency to limit the production on-costs in relation to the prior art. In relation to machining processes that make it possible to obtain an optimized surface finish, overmoulding is a production technique that is relatively straightforward.

According to another feature, the sheet exhibits an internal face, an external face at least partially coated with the coating and at least one through-orifice, the coating material being injected via at least one feed positioned on the side of the internal face of the sheet and in line with the through-orifice.

According to one embodiment, at least two feeds each comprise a nozzle which exhibits an end in raised relief with respect to a contact surface of the mould against which surface the internal face of the sheet is pressed, the end of the nozzle having shapes that complement those of the corresponding through-orifice so as to obtain a clearance-free fit between the end of the nozzle and the through-orifice.

According to another feature, the mould comprises at least one slide which comprises a finger able to move in a bore of the mould between a retracted state in which the finger does not interfere with the sheet and a deployed state in which it interferes with the sheet and, for each slide, the sheet comprises a hole the diameter of which is equal to that of the finger and which is positioned in the continuation of the bore of the mould when the sheet is correctly positioned in the mould.

According to another feature, the sheet comprises a continuation which extends beyond a front edge face of the sheet, and a rear zone which adjoins a rear edge face of the sheet; the mould comprises first and second moving parts able to move between an open position and a closed position, the first and second parts having complementing shapes configured to delimit the cavity in the closed position, the first part comprising a contact surface configured to receive an internal face of the sheet and the second part comprising the shaping surface and clamping flanks positioned one at each end of the shaping surface and configured to clamp the continuation and the rear zone of the sheet against the contact surface of the first part in the closed position.

According to one embodiment, the continuation is positioned in such a way as to leave the front edge face of the sheet at least partially clear.

According to another feature, the continuation of the sheet is removed after the overmoulding step.

According to another feature, the sheet is shaped in the same way as the panel that is to be obtained, prior to being placed in the mould.

Another subject of the invention is an aircraft leading edge panel obtained using the method and an aircraft leading edge comprising at least one panel according to the invention.

According to one configuration, the aircraft leading edge comprises two panels which comprise front lateral edge faces which come together contiguously at a junction plane positioned along an aerodynamic stagnation line, for each panel the coating at least partially covering the front edge face of the sheet.

A final subject of the invention is an aircraft comprising at least one leading edge according to the invention.

BRIEF DESCRIPTION OF THE DRAWINGS

Other features and advantages will become apparent from the following description of the invention, which description is given solely by way of example, with reference to the attached drawings among which:

FIG. 1 is a lateral view of an aircraft,

FIG. 2 is a perspective view of a wing, illustrating one embodiment according to the invention, FIG. 3 is a cross section of the wing profile visible in FIG. 2, FIG. 4 is an exploded view of the wing visible in FIG. 2, FIG. 5 is a cross section illustrating, in an exploded view, the wing visible in FIG. 2, FIG. 6 is a cross section through a panel positioned in a mould during an overmoulding step, which illustrates a simplified embodiment of the invention, FIG. 7 is a perspective view of a non-coated sheet, illustrating one embodiment of the invention, FIG. 8 is a cross section through the sheet visible in FIG. 7, FIG. 9 is a cross section through the uncoated sheet positioned between two parts of a mould in the open position, FIG. 10 is a cross section through the mould visible in FIG. 9, in the closed position, FIG. 11 is a cross section through a slide illustrating one embodiment of the invention, FIG. 17 is a cross section through a wing comprising two coated panels, illustrating one embodiment of the invention, FIGS. 18 and 19 are cross sections illustrating in detail the front part of the wing visible in FIG. 17, before and after the assembling of the coated panels, FIGS. 20 and 21 are cross sections illustrating in detail an intermediate part of the wing visible in FIG. 17 before and after the assembling of the coated panels, and FIG. 22 is a cross section illustrating in detail the rear part of the assembled coated panel.

DETAILED DESCRIPTION

Figure 12:
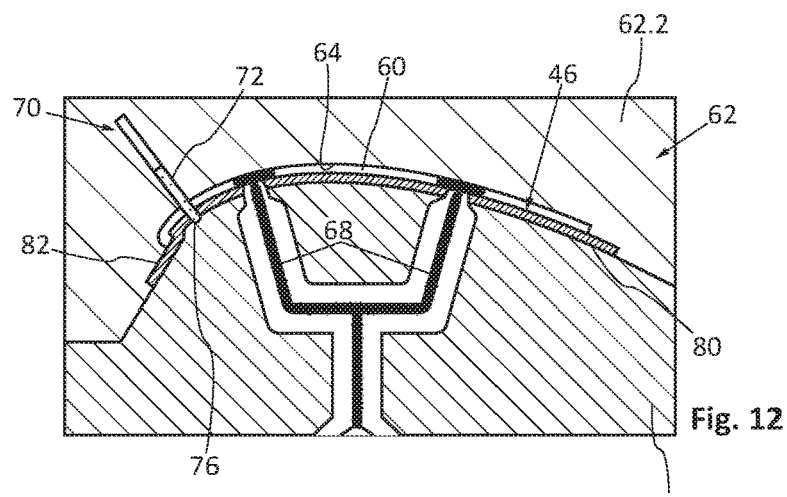
FIG. 12 is a cross section through the mould visible in FIG. 9, at the moment of filling.

FIG. 1 depicts at 10 an aircraft which comprises a fuselage 12, wings 14, nacelles 16 positioned under the wings 14, and a tail assembly 18.

For the remainder of the description, the front and the rear refer to the direction in which the air streams flow around the aircraft in flight. Thus, the nose cone 20 of the fuselage corresponds to that end of the fuselage 12 that pierces the air in flight, and the tail cone 22 of the fuselage corresponds to the opposite end of the fuselage 12 from the nose cone 20.

As illustrated in FIGS. 2 and 3, from a geometric standpoint, each wing 14 comprises a leading edge 24 positioned at the front of the wing 14, a trailing edge 26 positioned at the rear, an upper surface 28, also referred to as the extrados, which connects the leading edge 24 and the trailing edge 26, and a lower surface 30, also referred to as the intrados, which likewise connects the leading edge 24 and the trailing edge 26.

For the remainder of the description, a longitudinal direction is parallel to the leading edge 24 and a transverse plane is a plane perpendicular to the longitudinal direction.

According to one embodiment illustrated in FIGS. 4, 5 and 17, each wing 14 comprises:
a structure 32 made up of a front spar 34.1, of a rear spar 34.2, these being parallel to the longitudinal direction, and of ribs 36 which connect the front and rear spars 34.1, 34.2 and which are arranged in transverse planes,
at least one upper front panel 38 which extends from the leading edge 24 as far as a vertical mid plane PMV of the wing 14 (which plane is positioned between the leading edge 24 and the trailing edge 26),
at least one lower front panel 40 which extends from the leading edge 24 as far as the vertical mid plane PMV,
at least one upper rear panel 42 which extends from the vertical mid plane as far as the trailing edge 26, and
at least one lower rear panel 44 which extends from the vertical mid plane as far as the trailing edge 26.

These panels 38, 40, 42 and 44 are connected to the structure 32 by any appropriate means.

The upper and lower front panels 38, 40 may extend as far as a plane positioned before or after the vertical mid plane PMV. In one configuration, the upper and lower front panels 38, 40 extend as far as a plane positioned after the vertical mid plane PMV and at a distance from the corresponding leading edge 24 that corresponds to 60% of the chord between the leading and trailing edges 24, 26.

According to the example illustrated in FIG. 4, the wing 14 comprises a single upper front panel 38 and a single lower front panel 40 which extend along the entire length of the wing 14. In other examples (not depicted), the wing 14 comprises several upper front panels 38 and/or several lower front panels 40, juxtaposed and distributed along the length of the wing 14.

As illustrated in FIGS. 4, 5, 17, 18 and 19, each upper front panel 38 comprises a lateral front edge 38a and a lateral rear edge 38b and each lower front panel 40 comprises a lateral front edge 40a and a lateral rear edge 40b. The lateral front edge 38a of the upper front panel 38 and the lateral front edge 40a of the lower front panel 40 are parallel and come together contiguously at a joining plane PJ positioned at the leading edge 24, more particularly at an aerodynamic stagnation line corresponding to a zone in which the air flow splits into a first stream which flows over the top of the wing and a second stream which flows over the underside of the wing and in which zone the speed of the flow is nil or almost nil.

As illustrated in detail in FIGS. 15 to 23, each upper or lower front panel 38, 40 comprises a sheet 46 which has an internal face 46int facing towards the inside of the wing 14, an external face 46ext facing towards the outside of the wing 14, a front edge face 48 and a rear edge face 52 as well as a coating 54 which coats almost all of the external face 46ext of the sheet 46 and at least partially coats the front edge face 48 and has an exterior face 56 in contact with the air flows during operation.

According to a first embodiment, the sheet 46 is made of sheet metal plate. According to a second embodiment, the sheet 46 is made of composite material.

According to one embodiment, the coating 54 is made of silicone, of polyolefin, of polyoxymethylene (polyacetal) or of polyester.

The sheet 46 has a thickness of between 3 and 10 mm, and preferably equal to 5 mm.

The coating 54 has a thickness of between 3 and 10 mm and preferably equal to 3 mm.

Figure 16:
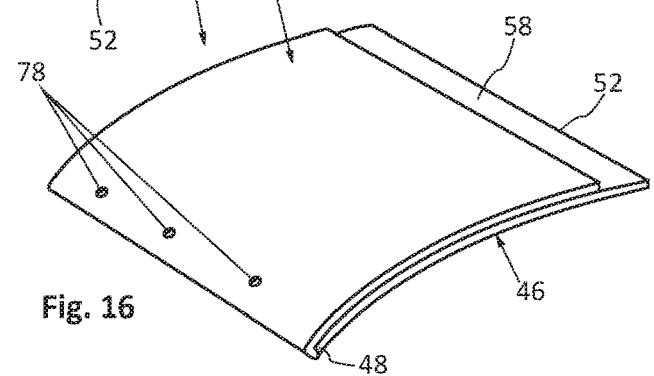
FIG. 16 is a perspective view of the panel visible in FIG. 15.

As illustrated in FIGS. 16 and 22, the external face 46*ext* of the sheet 46 comprises a rear zone 58 in the form of a strip which adjoins the rear edge face 52 and is not coated with the coating 54 but configured to accept another panel, notably an upper or lower rear panel 42, 44.

The coating 54 at least partially covers the front edge face 48 of the sheet 46, starting from the external face 46*ext*. According to one embodiment visible in FIG. 15, the coating 54 covers the entirety of the front edge face 48 of the sheet 46. According to another embodiment visible in FIGS. 18 and 19, the coating 54 covers approximately half the front edge face 48 of the sheet 46 starting from the external face 46*ext*.

According to one feature of the invention, the upper or lower front panel 38, 40 is obtained by overmoulding, by positioning the sheet 46 in a cavity 60 of a mould 62 which has a shaping surface 64 configured to shape the exterior face 56 of the coating 54 and which is spaced away from the sheet 46.

According to one procedure, the sheet 46 is shaped in the same way as the upper or lower front panel 38, 40 prior to being placed in the mould 62.

The shaping surface 64 of the mould 62 is produced in such a way as to have the lowest possible roughness and the tightest possible geometric and dimensional tolerances. What is meant by a low roughness is a roughness Ra and Rt of the order of 0.2 μm.

For the remainder of the description, an optimized surface finish corresponds to the lowest possible roughness and the tightest possible dimensional and geometric tolerances.

According to one particular feature of the invention, during the overmoulding step, the optimized surface finish of the shaping surface 64 of the mould 62 is transferred to the upper or lower front panel 38, 40.

Thus, after the overmoulding step, the exterior face 56 of the coating 54 has an optimized surface finish with a roughness Ra and Rt of the order of 0.2 μm and very good geometric or dimensional precision.

As a result, according to the invention, just one component (namely the mould 62 and more particularly the shaping surface 64 thereof) is produced by machining with an optimized surface finish. The optimized surface finish of the upper or lower front panels 38, 40 is obtained during the overmoulding of the coating 54 rather than by machining, and this has a tendency to limit production on-costs in relation to the prior art. In relation to machining methods that make it possible to obtain an optimized surface finish, overmoulding is a production technique that is relatively straightforward.

According to another feature of the invention, the sheet 46 comprises at least one through-orifice 66 (which opens onto the internal face 46*int* and external face 46*ext*) and the overmoulding of the coating 54 is obtained by injecting the material from the internal face 46*int* of the sheet 46. Thus, the mould 62 comprises at least one feed 68 positioned on the side of the internal face 46*int* of the sheet 46 and opening in line with each through-orifice 66.

This feature makes it possible not to have a roughness on the exterior face 56 of the coating 54 caused by the feeding of the material.

The number of through-orifices 66 is determined in such a way as to optimize the filling of the injected material. By way of indication, each through-orifice 66 is cylindrical and has a diameter of the order of 20 mm.

According to one configuration visible in FIGS. 7 to 13, the sheet 46 comprises at least one pair of through-orifices 66, 66' positioned in the one same transverse plane. Depending on its length, the sheet 46 comprises several pairs of through-orifices 66, 66' distributed along the length of the sheet 46.

In parallel with this, the mould 62 comprises as many feeds 68 as there are through-orifices 66, 66', which are arranged on the mould 62 in the same way as the through-orifices 66, 66'.

According to one feature of the invention, the mould 62 comprises at least one slide 70 to hold the sheet 46 during the injection of material and thus guarantee very good dimensional and/or geometric precision. This slide 70 also allows a zone to be protected locally from any ingress of moulded material so as to leave an opening free for the subsequent installation of any device.

According to one embodiment visible in FIGS. 10 and 11, each slide 70 comprises a finger 72 able to move in a bore 74 of the mould 62 between a retracted state in which the finger 72 does not interfere with the sheet 46 and a deployed state in which it interferes with the sheet 46.

The finger 72 takes the form of a cylinder which comprises a chamfer at a first end 76 configured to pass through the sheet 46.

The bore 74 has a diameter equal (to within the clearance required for sliding) to that of the finger 72 and opens into the cavity 60 of the mould 62. Advantageously, the bore 74 comprises a first portion 74.1 which is positioned of one side of the cavity 60 of the mould 62, which opens onto the shaping surface 64, and which is long enough to have the entirety of the finger 72 in the retracted state, and a second portion 74.2 which is positioned on the other side of the cavity 60 of the mould 62, in the continuation of the first portion 74.1 and which is configured to receive the first end 76 of the finger 72 in the deployed state.

For each slide 70, the sheet 46 comprises a hole 78 the diameter of which is equal (to within the clearance required for sliding) to that of the finger 72 and which is positioned in the continuation of the bore 74 of the mould 62 when the sheet 46 is correctly positioned in the mould 62.

The mould 62 generally comprises several slides 70.

The mould 62 comprises first and second moving parts 62.1 and 62.2 able to move between an open position visible in FIG. 9 and a closed position visible in FIG. 10, the first and second parts 62.1 and 62.2 having complementing shapes configured to delimit the cavity 60 in the closed position.

The first part 62.1 comprises the feeds 68 and a contact surface 80 configured in the same way as the internal surface 46*int* of the sheet 46 and configured to receive the said internal surface 46*int* during the overmoulding step.

The second part 62.2 comprises the slide or slides 70 and the shaping surface 64.

In order to ensure that the sheet 46 is held in position during overmoulding, the sheet 46 comprises a continuation 82 which extends beyond the front edge face 48 and which is positioned in such a way as to leave the front edge face 48 at least partially clear. This continuation 82 takes the form of a strip of material which has the same thickness as the rest of the sheet 46 and which has a first surface 82.1 in the same plane as the internal face 46*int* of the sheet 46 and a second surface 82.2 which is offset with respect to the internal face 46*int* of the sheet 46 so that the continuation 82 leaves the front edge face 48 completely clear.

This continuation 82 and the rear zone 58 are configured to be trapped by the first and second parts 62.1 and 62.2 of the mould in the closed position.

To complement that, the second part 62.2 of the mould 62 comprises clamping flanks 84, arranged one at each end of the shaping surface 64 and configured to clamp the continuation 82 and the rear zone 58 of the sheet 46 against the contact surface 80 of the first part 62.1 of the mould in the closed position.

According to another feature, the mould 62 comprises at least two centring tips 86 in raised relief with respect to the contact surface 80 of the mould 62 to make it easier to place the sheet 46 in the mould.

According to one embodiment, at least two feeds 68 each comprise a nozzle 88 which has an end 88.1 in raised relief with respect to the contact surface 80, as illustrated in FIG. 9, and the shapes of which complement those of the corresponding through-orifice 66 so as to obtain a clearance-free fit between the end 88.1 of the nozzle 88 and the through-orifice 66, 66'.

In order to guarantee optimum filling of the cavity 60 during the overmoulding, the mould 62 comprises a system to encourage the extraction or exhausting of the air contained in the cavity 60.

According to one embodiment, the mould 62 comprises an evacuating system which extracts the air from the cavity 60 prior to and/or at the time of the injection of material.

According to another embodiment, a clearance of the order of 0.05 mm is left around the first and second parts 62.1, 62.2 of the mould 62 to encourage the exhausting of air while at the same time preventing the injected material from infiltrating this space.

To inject material, the mould 62 can be positioned on an injection moulding press.

The method for manufacturing a leading edge panel is now described with reference to FIGS. 7 to 16.

The first step involves creating the sheet 46 and shaping it to the profile of the panel 38, 40 that is to be obtained, as illustrated in FIGS. 7 and 8. The sheet 46 may be a machined sheet metal plate or may be produced from composite material. Unlike the panels of the prior art, the sheet 46 may have a high level of roughness and be manufactured to wide dimensional and geometric tolerances, in so far as this sheet 46 will subsequently be coated with a coating 54.

Next, the sheet 46 is positioned on the contact surface 80 of the first part 62.1 of the mould 62. The centring tips 86 make it easier to position the sheet 46 in the correct position.

Figure 13:
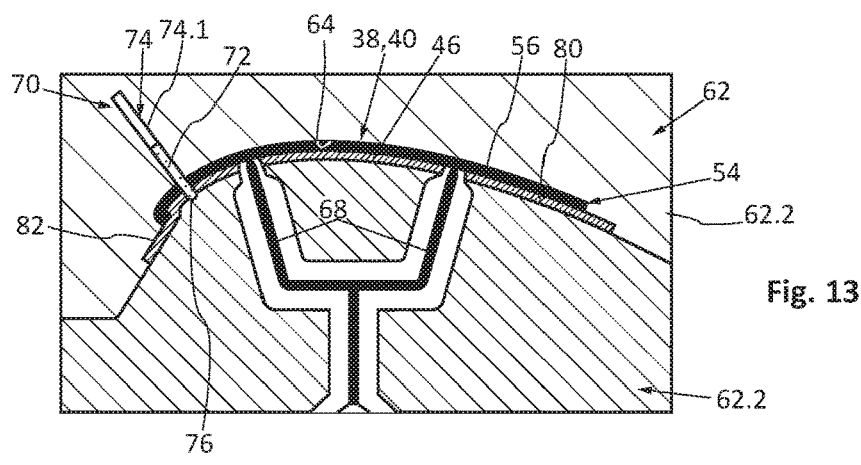
FIG. 13 is a cross section through the mould visible in FIG. 9, at the end of filling.

The mould 62 is closed as illustrated in FIG. 10. The continuation 82 and the rear zone 58 of the sheet 46 are clamped between the first and second parts 62.1, 62.2 of the mould 62 and the slide or slides 70 is(are) positioned in the deployed state. Once that is achieved, the injection of material can begin, as illustrated in FIG. 12, until the cavity 60 is completely filled, as illustrated in FIG. 13.

Figure 14:
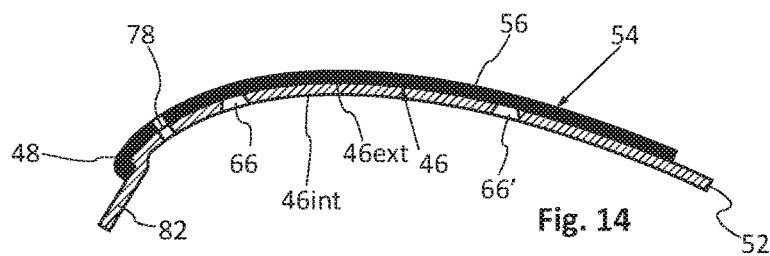
FIG. 14 is a cross section through a coated plate obtained after demoulding.
Figure 15:
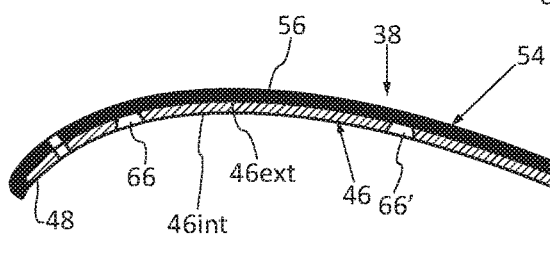
FIG. 15 is a cross section through a coated panel obtained from the sheet visible in FIG. 14, after a machining step.

After cooling, the coated sheet 46 is removed from the mould, as illustrated in FIG. 14. Finally, the continuation 82 of the sheet 46 is removed, for example by machining, so as to obtain a coated upper or lower front panel 38, 40, as illustrated in FIGS. 15 and 16.

At the end of this manufacturing process, the upper or lower front panel 38, 40 comprises a face in contact with the air flows during operation (which corresponds to the exterior face 56 of the coating 54) that has a small level of roughness and high dimensional and geometric precision conferred to it during the overmoulding by the shaping surface 64 of the mould 62.

According to another embodiment, the sheet 46 comprises no through-orifice 66 and the overmoulding of the coating 54 is obtained by injecting the material from the external face 46ext of the sheet 46. Thus, the mould 62 comprises at least one feed 68 positioned on the same side as the external face 46ext of the sheet 46 and opening on to the shaping surface 64. The ends 88.1 of the nozzles 88 may project relative to the shaping surface 64. With this embodiment, in line with the recesses left by the ends 88.1 of the nozzles 88 at the time of injection, holes are created by counterdrilling for fixings used to connect the upper or lower front panel 38, 40 to the structure 32. Once the upper or lower front panel 38, 40 has been fixed to the structure 32, the holes are filled.

This manufacturing process is repeatable and stable and does not involve any potential corrective manual actions such as when shaping of the leading edges in the prior art.

The upper or lower front panel 38, 40 is next attached and fixed to the structure 32 of the wing 14. For preference, fixing lugs are provided on the internal face 46int of the sheet 46 to allow the upper or lower front panel 38, 40 to be attached without resorting to fixings that pass through it.

When fixing the upper or lower front panel 38, 40 to the structure 32, the exterior face 56 is used as a reference surface, unlike in the prior art. As illustrated in FIGS. 20 and 22, shims 90 may be interposed between the upper or lower front panel 38, 40 and the structure 32 so that the exterior surface 56 is correctly positioned.

At the leading edge, the upper and lower front panels 38 and 40 are joined contiguously, as illustrated in FIG. 19. Finally, the upper and lower rear panels 42 and 44 are brought into position and fixed to the structure 32 of the wing 14, these panels 42 and 44 covering the rear zone 58 of the upper and lower front panels 38 and 40, as illustrated in FIG. 23.

According to a simplified embodiment illustrated in FIG. 6, the leading edge comprises a U-shaped panel which exhibits a U-shaped sheet 46 coated with a coating 54 during a step of overmoulding in a mould 62 which exhibits a shaping surface 64 having an optimized surface finish which confers an optimized surface finish on the exterior surface 56 of the coating 54.

The leading edge thus obtained makes it possible to extend the laminar flow towards the rear of the wing thus having a tendency to reduce the drag by the order of 8% at cruising speed and aviation-fuel consumption by the order of 4 to 5%.

Although described in an application to the leading edge of a wing, the panels obtained according to the method of manufacture of the invention can be used at other leading edges of the aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing an aircraft leading edge panel, the method comprising:

placing a sheet in a cavity of a mould, the cavity delimited by a shaping surface configured to shape an exterior face of the panel that is to be obtained, the shaping surface having an optimized surface finish, wherein the optimized surface finish includes a roughness Ra and Rt of the order of 0.2 µm; and overmoulding a coating onto the sheet by injecting a material into the cavity of the mould, the coating comprising, after the overmoulding step, an exterior face which corresponds to the exterior face of the panel that is to be obtained, the exterior face of the coating having the optimized surface finish conferred by the shaping surface of the mould, wherein the sheet comprises an internal face, an external face at least partially coated with the coating and at least one through-orifice, wherein the coating material is injected via at least one feed positioned on the side of the internal face of the sheet and in line with the through-orifice, and wherein at least two feeds each comprise a nozzle having an end in raised relief with respect to a contact surface of the mould against which surface the internal face of the sheet is pressed, the end of the nozzle having shapes that complement those of the corresponding through-orifice so as to obtain a clearance-free fit between the end of the nozzle and the through-orifice.

2. The method for manufacturing an aircraft leading edge panel according to claim 1, wherein the mould comprises at least one slide comprising a finger able to move in a bore of the mould between a retracted state in which the finger does not interfere with the sheet and a deployed state in which the finger interferes with the sheet, and wherein, for each of the at least one slide, the sheet comprises a hole, a diameter of the hole being equal to that of the finger and positioned in the continuation of the bore of the mould when the sheet is correctly positioned in the mould.

3. The method for manufacturing an aircraft leading edge panel according to claim 1, wherein the sheet comprises a continuation extending beyond a front edge face of the sheet, and a rear zone adjoining a rear edge face of the sheet, and wherein the mould comprises first and second moving parts able to move between an open position and a closed position, the first and second parts having complementing shapes configured to delimit the cavity in the closed position, the first part comprising a contact surface configured to receive an internal face of the sheet and the second part comprising the shaping surface and clamping flanks positioned one at each end of the shaping surface and configured to clamp the continuation and the rear zone of the sheet against the contact surface of the first part in the closed position.

4. The method for manufacturing an aircraft leading edge panel according to claim 3, wherein the continuation is positioned in such a way as to leave the front edge face of the sheet at least partially clear.

5. The method for manufacturing an aircraft leading edge panel according to claim 3, wherein the continuation of the sheet is removed after the overmoulding step.

6. The method for manufacturing an aircraft leading edge panel according to claim 1, wherein the sheet is shaped in the same way as the panel that is to be obtained, prior to being placed in the mould.

7. An aircraft leading edge panel obtained using the method according to claim 1.

8. An aircraft leading edge comprising at least one panel according to claim 7, the at least one panel comprises two panels each comprising front lateral edge faces which come together contiguously at a junction plane positioned along an aerodynamic stagnation line, for each panel the coating at least partially covering the front edge face of the sheet.

9. An aircraft comprising at least one leading edge according to claim 8.

* * * * *